Patented Feb. 15, 1927.

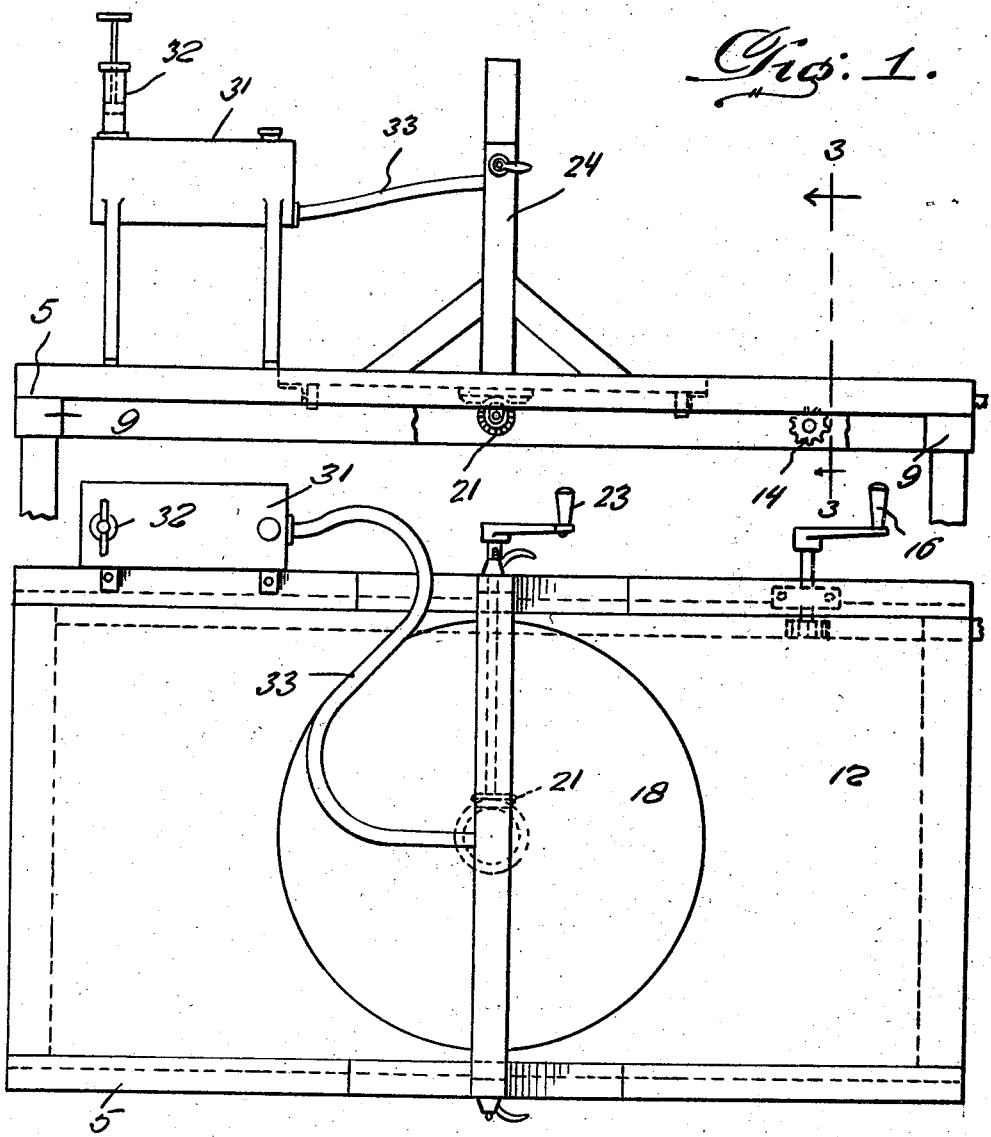

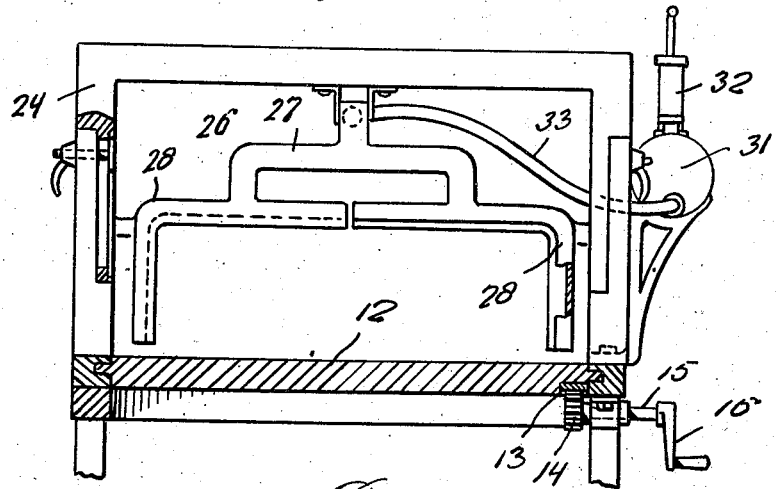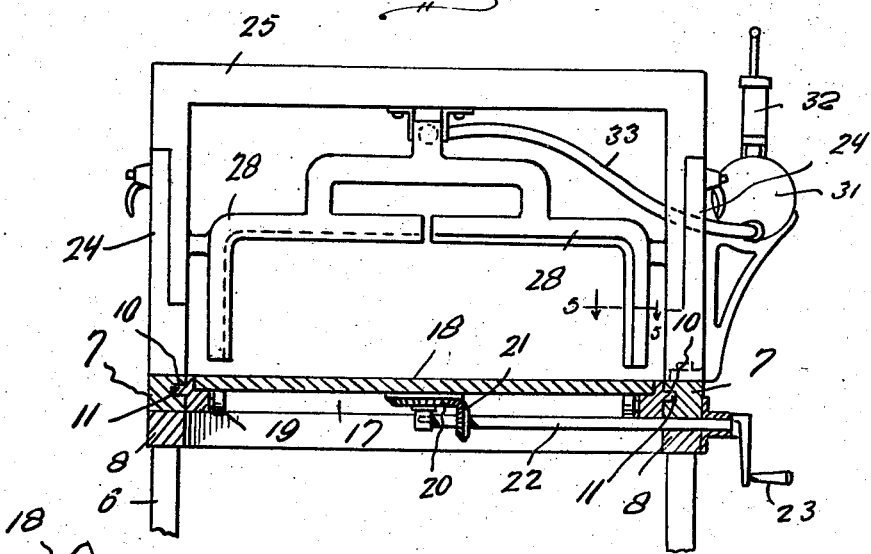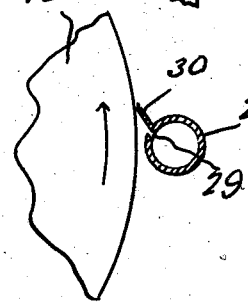

1,618,053

UNITED STATES PATENT OFFICE.

JAMES W. CATES, OF COFFEYVILLE, KANSAS.

CAKE-ICING MACHINE.

Application filed July 23, 1926. Serial No. 124,466.

This invention relates generally to confectionery apparatus, and has more particular reference to a machine for use in the icing of cakes, the primary object of the invention residing in the provision of a machine of this character that is relatively simple of construction and operation, and one that may be employed in the icing of round, square or oblong cakes, in a rapid and highly efficient manner.

Other objects will become apparent as the nature of the invention is better understood, the same comprising the novel form, combination, and arrangement of parts hereinafter more fully described, shown in the accompanying drawings and claimed.

In the drawings wherein like numerals indicate like parts throughout the views:

Figure 1 is a fragmentary side elevation of a machine constructed in accordance with the present invention.

Figure 2 is a top plan view thereof.

Figure 3 is a detail vertical section taken substantially upon the line 3—3 of Figure 1 looking in the direction of the arrows.

Figure 4 is a similar view taken at a point near the center of the machine, and

Figure 5 is a section taken substantially upon the line 5—5 of Figure 4 and looking downwardly in the direction of the arrows, this figure more clearly disclosing the construction of one of the icing discharge devices of the machine.

Now having particular reference to the drawing wherein there is disclosed the most preferred embodiment of the present invention, of which I am at this time familiar, the said machine constitutes the provision of a substantially rectangular shaped frame 5 from the corners of which depend supporting legs 6. The frame 5 preferably includes two proposed side bars 7—7 and 8—8 the lower bars terminating short of the opposite ends of the upper bars, and being interconnected by cross bars 9—9. The inner sides of the upper bars 7—7 of the frame are longitudinally slotted as at 10—10 and slidably arranged therein are longitudinal ribs 11—11 upon the opposite sides of a rectangular shaped cake supporting board 12, the under side of which is provided at one edge with a longitudinally extending rack bar 13 in mesh with the teeth of which is a small gear 14 upon the inner end of a short shaft 15 suitably journaled to the adjacent side of the frame 5, the outer end of this shaft carrying a hand crank 16. Obviously, the turning of this hand crank in opposite directions will cause the sliding movement of the cake board 12 in reverse direction within the frame.

The center of the cake board 12 is formed with a relatively large circular rabbeted opening 17 within which is arranged a circular and rotary cake supporting board 18 that is supported at its bottom side by rollers 19 mounted within the opening 17 of the rectangular cake supporting board 12. This circular cake board 18 is provided at its under side and at its center with a bevel gear 20 in mesh with which is a smaller bevel gear 21 mounted upon the transversely arranged shaft 22 that is also journaled through certain side bars, of the frame 5 as indicated in Figure 4, the outer end of the shaft being equipped with a hand crank 23. Obviously, a turning of the crank will facilitate the rotation of the board 18 in an obvious manner.

Extending vertically from the sides of the frame 5 at the center thereof are posts 24 to the upper ends of which are vertically adjustably secured the end bars of an inverted substantially U-shaped frame 25.

Secured to the under side of this frame 25 and at the center thereof is a depending icing discharging unit designated generally by the reference character 26. This unit consists of a transversely extending horizontal pipe 27 the ends of which are turned downwardly and have communication with a pair of relatively L-shaped pipes 28—28 that are formed at their inner sides with narrow icing discharging slots 29, Figure 5, from certain side edges of which are tangentially arranged icing spreading blades 30, the blades of the pipes 28—28 preferably extending in the opposite direction as indicated in Figures 3 and 4.

Supported upon one side of the machine frame is an icing container 31 equipped with an air pump 32 whereby the icing may be forcibly ejected therefrom. For establishing communication between this icing receptacle 31 and the primary rceiving pipe 27 of the icing distributing unit 26 is a flexible hose 33, and it will at once be apparent that when a square or oblong cake of predetermined size has been supported upon the main cake board 12, the movement of the cake board in reverse direction will result in the distribution of the icing upon the top and sides thereof.

When a circular cake is to be iced, the same is supported upon the circular rotating board 18 and then by turning the same through reason of the handle 23, here again the top and side of the cake will be properly iced.

It will thus be seen that I have provided a highly novel, and efficient form of machine for facilitating the icing of cake that is well adapted for all the purposes heretofore designated, even though I have herein shown and described the invention as consisting of certain detail structural elements, nevertheless it is to be understood that some changes may be made without departing from the spirit and scope of the appended claims.

Having thus described the invention, what I claim as new and desire to secure by Letters Patent is:—

1. In a cake icing machine of the character described, a frame, a cake board movably disposed upon the frame, an icing receptacle supported in position at one side of the frame, relatively L-shaped icing discharge pipes supported in position above the frame, and at opposite sides of the cake board, said pipes having icing discharge slots at the inner sides thereof, and means for conveying the icing from the receptacle to said pipes.

2. In a cake icing machine of the character described, a frame, a cake board movably disposed upon the frame, an icing receptacle supported in position at one side of the frame, relatively L-shaped icing discharge pipes supported in position above the frame, and at opposite sides of the cake board, said pipes having icing discharge slots at the inner sides thereof, means for conveying the icing from the receptacle to said pipes, and means whereby the icing may be forcibly discharged from the receptacle.

3. In a cake icing machine of the character described, an open frame, a cake board movably mounted within the frame, relatively L-shaped icing discharge pipes supported in position above the cake board at opposite edges thereof, said pipes being formed at their inner sides with icing discharging slots, an icing receptacle supported in position upon the frame and a communicating pipe between the receptacle and said icing discharging pipe.

4. In a cake icing machine of the character described, an open frame, a cake board movably mounted within the frame, relatively L-shaped icing discharge pipes supported in position above the cake board at opposite edges thereof, said pipes being formed at their inner sides with icing discharging slots, an icing receptacle supported in position upon the frame and a communicating pipe between the receptacle and said icing discharging pipe, said cake board being formed centrally with a circular turn table directly beneath the icing discharge pipes for receiving a circular cake and means for rotating the turn table within the opening in the board 5. In a cake icing machine, a frame, a cake supporting member movable on the frame, a pair of standards extending upwardly from the frame on opposite sides of the cake supporting member, an inverted substantially U-shaped member, said U-shaped member being vertically adjustable between said standards, an icing discharge unit extending from the crown portion of the inverted U-shaped member, and an icing supply receptacle in communication with the discharge unit.

6. In a cake icing machine of the class described, a frame, a cake supporting member movable on the frame, a pair of standards extending upwardly from the frame on opposite sides of said cake supporting member, an inverted substantially U-shaped frame vertically adjustable between the standards, an icing discharge unit carried by the inverted U-shaped frame, an icing supply receptacle supported on the first mentioned frame in communication with the icing discharge unit, said icing discharge unit including a horizontal pipe having an intermediate supply inlet, a pair of opposed substantially L-shaped pipes communicating with the respective ends on the horizontal pipe, and adapted for disposition above the top of the cake and at the opposite side thereof, said L-shaped pipes having icing discharge slots at the inner sides thereof.

7. In a cake icing machine of the class described, a frame, a cake supporting member movable on the frame, a pair of standards extending upwardly from the frame on opposite sides of said cake supporting member, an inverted substantially U-shaped frame vertically adjustable between the standards, an icing discharge unit carried by the inverted U-shaped frame, an icing supply receptacle supported on the first mentioned frame in communication with the icing discharge unit, said icing discharge unit including a horizontal pipe having an intermediate supply inlet, a pair of opposed substantially L-shaped pipes communicating with the respective ends on the horizontal pipe, and adapted for disposition above the top of the cake and at the opposite side thereof, said L-shaped pipes having icing discharge slots at the inner sides thereof, and deflectors arranged on the side edges of the slotted portions of the L-shaped pipes in opposed directions.

In testimony whereof I affix my signature.

JAMES W. CATES.